Figure 1:
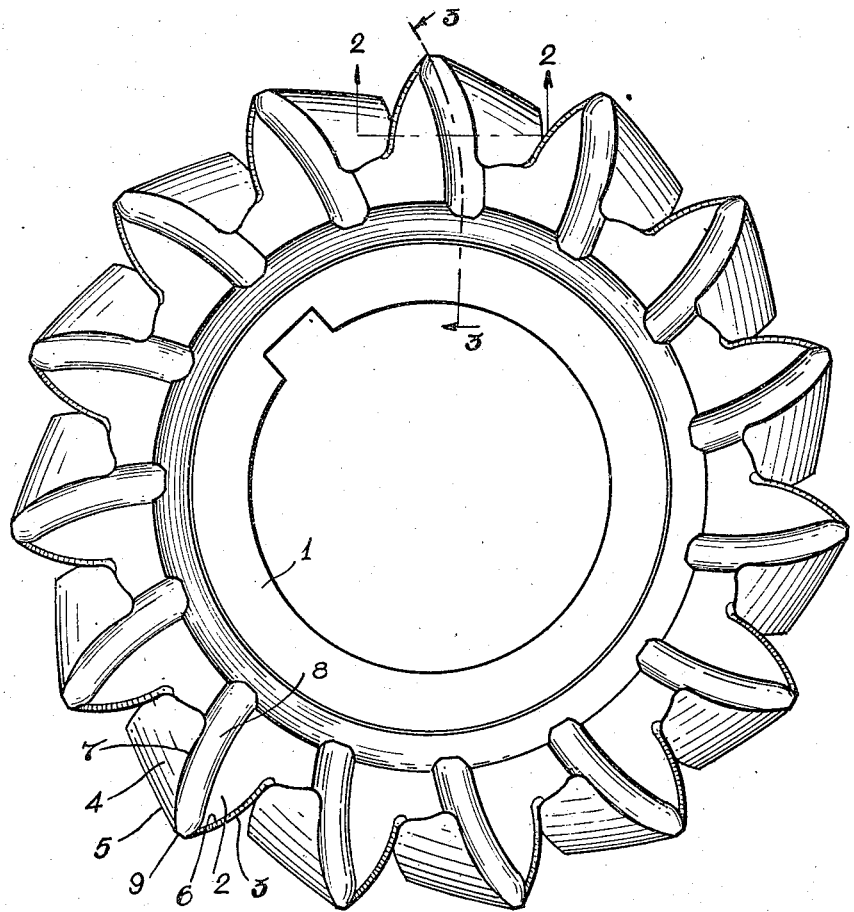

Oct. 14, 1941.    A. ERHARDT    2,258,849

GEAR CUTTER

Filed Sept. 27, 1938

INVENTOR.
Anton Erhardt
BY Fay, Oberlin & Fay
ATTORNEYS

Patented Oct. 14, 1941

2,258,849

UNITED STATES PATENT OFFICE 2,258,849

GEAR CUTTER

Anton Erhardt, Cleveland, Ohio, assignor to The National Tool Company, Cleveland, Ohio, a corporation of Ohio Application September 27, 1938, Serial No. 231,893

11 Claims. (Cl. 29—103)

The present invention relates to a machine tool in the form of a gear or pinion adapted to be used in cutting and generating the threads of gears, worms and the like. More particularly, the invention pertains to the provision of a cutting edge on a gear shaped cutter having helically disposed cutting teeth. In such a helical, gear shaped cutter, the effective or cutting edges of the teeth are normally defined by the intersection of the helicoid side faces and the flat end face perpendicular to the axis of the cutter. However, the edges normally defined by these surfaces result in the production of an edge on one side of the cutting tooth which is relatively sharp and an edge on the other side of the cutting tooth which is relatively blunt. In other words, the angle between one helicoid side face of a cutting tooth and the flat end face perpendicular to the axis of the cutter is normally acute, and the angle between the other helicoid side face and the flat end face of the cutter tooth is normally obtuse. In order to correct this inequality in the cutting edges of the helical cutting teeth and to produce an effective and efficient cutting action, it has previously been proposed to cut or grind back the cutting edges on each side face of the tooth to substantially equal angles. One such method of correction is taught in Simmons U. S. Patent No. 1,809,869, issued Jan. 16, 1931, wherein internal and external helicoid surfaces are ground on the end face of the cutting teeth, such surfaces intersecting with the helicoidal side faces of the teeth to form the cutting edges.

I have found, however, that in such prior methods of correction of the cutting edges of a helical type gear shaped cutter, such as disclosed in the aforesaid prior patent, and as known and practiced by others in the art that a difficulty and disadvantage presents itself in the area of the tooth adjacent the top or crown where these cut or ground back surfaces intersect with each other and with the crown surface of the tooth, particularly where such crown surface is of any substantial width as distinguished from a relatively sharp point or line. It has, therefore, been found necessary in the prior art and practice to impart an additional corrective treatment to the area of the cutting tooth adjacent its crown in order to produce the necessary cutting action, since the cutting action of the top or crown of the cutting tooth is just as important, if not more, than that of the side edges of the tooth.

I have discovered that this previously required additional treatment of the crown area of the cutting tooth can be eliminated, and a relatively much more efficient cutting edge provided all around the side and crown edges of the tooth during, and as part of, the cutting or grinding back of one side cutting edge. Briefly outlined, my invention consists in the provision or generation of a groove of uniform cross-sectional dimensions along one helicoid side face of the tooth to a point adjacent the top or crown of the tooth where the depth and width of the groove is gradually reduced to merge or coincide with the normal line of intersection between the flat end face and the top or crown surface of the two. In this manner there is provided a side cutting edge and a crown or top cutting edge of the tooth which blend or merge one into the other, and both of which possess the required rake, relief or clearance for an efficient cutting action, and with the elimination of irregularities or sharp "breaks" in the surface of cutting action. My invention also provides an efficient and inexpensive method for so forming or generating such a groove with the resultant form of cutting edges, which eliminates the hertofore required additional and separate steps for the treatment of the top or crown area of the cutting tooth.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 2:
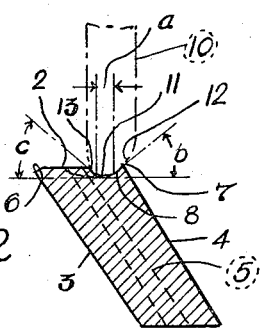
Figure 3:
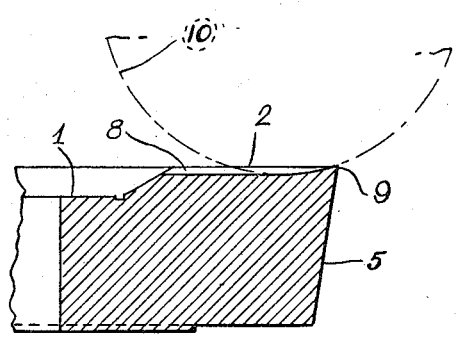
Figure 4:
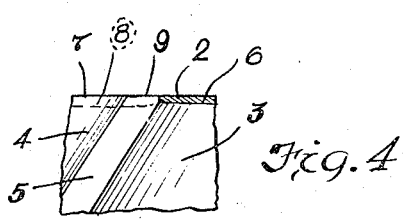

In said annexed drawings:

Fig. 1 is an end elevation of a gear shaped cutter embodying the principle of my invention; Fig. 2 is a detail sectional view taken substantially along line 2—2 of Fig. 1; Fig. 3 is a detail sectional view taken substantially along the involute plane corresponding with the bottom of the groove on the flat end face of a tooth; and as indicated by the curved section line 3—3 of Fig. 1; and Fig. 4 is a fragmentary view of one of the teeth and taken in a direction toward the top or crown thereof.

Now referring more particularly to the drawing, the gear shaped cutter shown therein consists of the hub 1 carrying helical cutting teeth having the flat end faces 2, perpendicular to the axis of the cutter and the helicoid side faces 3 and 4. The helicoid side face 3 normally intersects the flat end face 2 at an acute angle. The helicoid side face 4 normally intersects the flat end face 2 at an obtuse angle. The outside end face of the cutter teeth is defined by the top or crown surface 5, which also intersects the flat end face 2. The crown surface 5 is conoidal and slightly inclined to the axis of the cutter, so that it also intersects the flat end face 2 at an acute angle.

The acute angle, side face cutting edge of the tooth, defined by the side face 3 and the end face 2 is ground off as indicated at 6 in order to provide a resultant cutting edge having an angle substantially equal to the cutting edge 7 on the other side of the tooth which is defined by the edge of the groove 8 and the helicoid side face 4. The cutting edge 9 on the outside end of the tooth is defined by the intersection of the outer terminal end of the groove 8 and of the crown surface 5. It will be noted by particular reference to Figs. 1 and 3 that the width and depth of the groove 8 gradually decreases at a point approaching the outer end or crown of the tooth, so that its bottom merges or coincides with the line of intersection between the crown surface 5 and a flat end surface 2, forming of course the cutting edge 9.

The groove 8 is cut or ground out by means of a rotary cutting tool or grinding wheel 10 whose axis is disposed perpendicularly to the axis of the cutter. The bottom surface edge 11 of the grinding wheel 10 is of a width $a$ equal to the width of the crown surface 5 of the tooth at its point of intersection with the flat end face 2. As will be seen by reference to Fig. 2, side faces 12 and 13 merge with the bottom or intermediate surface 11 of the grinding wheel 10 and are inclined at angles $b$ and $c$ with respect thereto.

The cutting tool or grinding wheel 10 is mounted in a manner well known to those in the art in the grinding wheel head of a gear generating machine and traversed with respect to the cutter from the inside to the outside radial portions of the cutting teeth (i. e., in a direction from the tooth base to the tooth crown), and in a path corresponding and parallel to the curvature (usually an involute curve) of the helicoid side face 4. It will be understood that although the grinding wheel 10 of the cutter has last been described as being traversed with respect to the cutter, in strict sense, the axis of the grinding wheel in most generating machines is held stationary and the cutter moved with respect thereto. As the periphery of the grinding wheel 10 coincides with the normal line of intersection between the crown surface 5 and the flat end face 2, its traversing movement is discontinued, thus resulting in the decrease in width and depth of the groove 8 in the area adjacent the crown of the tooth. Thus in the single operation of grinding back the cutting edge 7 of the tooth, the desired cutting edge 9 is simultaneously provided, and in such a form that it merges and blends into the side cutting edge 7. Furthermore, as will be seen from Figs. 1 and 4, there also results a blending or merging between the crown cutting edge 9 and the acute angle side cutting edge formed by the surface 6 and a side face 3.

It should be obvious to those skilled in the art that as an equivalent mode of operation of my above described process that instead of stopping or discontinuing the traverse of the grinding wheel 10 from the base to the crown of the tooth, that the same result can be achieved by means of changing the path of travel of the wheel in the direction of its radial plane; or in other words, by camming or curving upwardly (away from the plane of the end face 2) the axis of the grinding wheel 10 with respect to the cutter.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth.

2. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of decreasing depth in a direction toward the tooth crown.

3. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and the flat end surface of the tooth, said groove being of decreasing width in a direction toward the tooth crown.

4. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of decreasing width in a direction toward the tooth crown, the width of said groove at the point of intersection with said tooth crown being equal to the width of the latter.

5. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of decreasing width and depth in a direction toward the tooth crown.

6. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intesection of the crown surface and of the flat end surface of the tooth, said groove being of decreasing width and depth in a direction toward the tooth crown, the width of said groove at the point of intersection with said tooth crown being equal to the width of the latter.

7. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of substantially U-shaped cross-section with outwardly inclined sides.

8. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of substantially U-shaped cross-section with outwardly inclined sides, the bottom of said groove being of a width equal to the width of said tooth crown.

9. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of uniform depth from the tooth base to a point adjacent the tooth crown, and of gradualy decreasing depth to zero depth from said point to the tooth crown.

10. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of uniform width from the tooth base to a point adjacent the tooth crown and of gradually decreasing width from thereon to a width equal to that of the tooth crown.

11. A gear shaped cutter having helical cutting teeth with a cutting edge formed by the intersection of a side face and a groove in the end face, said groove extending from the base to the crown of the tooth and having one edge coinciding with the normal tooth edge along both the side and the crown, the bottom of said groove coinciding with the line of intersection of the crown surface and of the flat end surface of the tooth, said groove being of uniform depth and width from the tooth base to a point adjacent the tooth crown and of gradually decreasing width and depth from said point to said crown, said width decreasing to a width equal to the width of said crown, and said depth decreasing to zero.

ANTON ERHARDT.